US009651713B2

(12) United States Patent
Takahashi (10) Patent No.: US 9,651,713 B2
(45) Date of Patent: May 16, 2017

(54) OPTICAL PRODUCT AND SPECTACLE PLASTIC LENS (71) Applicant: Tokai Optical Co., Ltd., Okazaki-Shi (JP)

(72) Inventor: Hirotoshi Takahashi, Okazaki (JP)

(73) Assignee: Tokai Optical Co., Ltd., Okazaki-Shi (JP)

( * ) Notice: Subject to any disclaimer, the term of this patent is extended or adjusted under 35 U.S.C. 154(b) by 112 days.

(21) Appl. No.: 14/627,424

(22) Filed: Feb. 20, 2015

(65) Prior Publication Data

US 2015/0192701 A1 Jul. 9, 2015

Related U.S. Application Data (63) Continuation of application No. PCT/JP2013/073958, filed on Sep. 5, 2013.

(30) Foreign Application Priority Data

Sep. 7, 2012 (JP) ................. 2012-197689

(51) Int. Cl.
*G02B 1/11* (2015.01)
*G02C 7/10* (2006.01)
*G02B 1/115* (2015.01)

(52) U.S. Cl.
CPC ............ *G02B 1/11* (2013.01); *G02B 1/115* (2013.01); *G02C 7/10* (2013.01); *G02C 2202/16* (2013.01)

(58) Field of Classification Search
CPC . G02B 1/00; G02B 1/041; G02B 1/11; G02B 1/111; G02B 1/113; G02B 1/115;

(Continued)

(56) References Cited

U.S. PATENT DOCUMENTS

2002/0048087 A1 4/2002 Mitsuishi et al.
2005/0122576 A1 6/2005 Yonetani et al.
(Continued)

FOREIGN PATENT DOCUMENTS

EP 2 431 772 A1 3/2012
JP 2002-071903 A1 3/2002
(Continued)

OTHER PUBLICATIONS

Extended European Search Report (Application No. 13834442.9) dated Jul. 20, 2015.

(Continued)

*Primary Examiner* — Scott J Sugarman
*Assistant Examiner* — Ibrahima Diedhiou
(74) *Attorney, Agent, or Firm* — Burr & Brown, PLLC (57) ABSTRACT An optical product includes an optical multilayer film on an optical product base, a color of reflected light of the optical multilayer film satisfies a condition of $0.27 \leq x \leq 0.31$ and $0.30 \leq y \leq 0.36$ in a chromaticity diagram (x,y,Y) of a CIE color system, reflectance is always 1 percent or less in a wavelength range from 420 nanometers (nm) to 680 nm, both inclusive, Y is 0.5 percent or less, and the optical multilayer film has a total of seven layers, in which a first layer is counted from an optical product base side, and odd layers are low refractive index layers and even layers are high refractive index layers, and an optical film thickness of a sixth layer is greater than or equal to $0.530\lambda$, and not greater than $0.605\lambda$ when $\lambda$ represents a design wavelength (any value in a range from 480 nm to 520 nm, both inclusive).

8 Claims, 5 Drawing Sheets (58) Field of Classification Search
CPC ... G02B 5/02; G02B 5/20; G02B 5/28; G02B 5/285; G02B 6/29353; G02B 6/29361; G02B 26/001; G02B 27/0018; G02B 3/0087; G02B 3/10; G02C 7/00; G02C 7/02–7/028; G02C 7/04–7/049; G02C 7/10–7/108; G02C 2200/00; G02C 2202/16; G02C 2202/22; G02C 5/00; G02C 5/001; G02C 11/12; C08L 75/04; C08L 83/04; C08L 69/00; G02F 1/133504
USPC ............ 351/41, 44, 159.01, 159.49, 159.55, 351/159.57, 159.6, 159.62, 159.63, 351/159.64, 159.65, 159.73; 359/580, 359/581, 586, 588, 599, 601, 642, 722, 359/723, 738
See application file for complete search history.

(56) References Cited

U.S. PATENT DOCUMENTS

2007/0146868 A1 6/2007 Yamaguchi
2009/0225298 A1 9/2009 Tokimitsu
2012/0200927 A1 8/2012 Deguchi et al.
2013/0135742 A1 5/2013 Fukagawa et al.

FOREIGN PATENT DOCUMENTS

| JP | 2003-248103 A1 | 9/2003 | |
| JP | 2005-275294 A1 | 10/2005 | |
| JP | 2007-171735 A1 | 7/2007 | |
| JP | WO 2012023371 A1 * | 2/2012 | ............ G02B 1/115 |
| JP | 2012-042830 A1 | 3/2012 | |
| JP | 2012-163779 A1 | 8/2012 | |
| WO | 2012/023371 A1 | 2/2012 | |

OTHER PUBLICATIONS

International Search Report (Application No. PCT/JP2013/073958) dated Oct. 22, 2013.

* cited by examiner

| | x | y | LUMINOUS REFLECTANCE Y [%] |
|---|---|---|---|
| EXAMPLE 1 | 0.30 | 0.33 | 0.27 |
| EXAMPLE 2 | 0.31 | 0.33 | 0.24 |
| EXAMPLE 3 | 0.31 | 0.35 | 0.22 |
| EXAMPLE 4 | 0.30 | 0.33 | 0.27 |
| EXAMPLE 5 | 0.30 | 0.30 | 0.34 |
| COMPARATIVE EXAMPLE 1 | 0.35 | 0.27 | 0.41 |
| COMPARATIVE EXAMPLE 2 | 0.31 | 0.31 | 0.74 |

FIG. 4

OPTICAL PRODUCT AND SPECTACLE PLASTIC LENS

CROSS-REFERENCE TO RELATED APPLICATIONS

This application claims the entire benefit of Japanese Patent Application Number 2012-197689 filed on Sep. 7, 2012 and International Patent Application PCT/JP2013/073958 filed on Sep. 5, 2013, the entirety of which is incorporated by reference.

BACKGROUND OF THE INVENTION

1. Field of the Invention

The present invention relates to optical products such as spectacle lenses and spectacle plastic lenses.

2. Description of Related Art

In plastic optical products, an optical multilayer film as an antireflection film is formed on the surface in order to reduce light reflection from the surface. Such an optical multilayer film is formed by alternately stacking several low refractive index and high refractive index layers, and an antireflection film having W-shaped spectral distribution of reflectance with a local maximum point at around 520 nm (nanometers) is commonly used in view of processing stability and appearance. Thus, upon incidence of light on the optical product having the optical multilayer film, a light green reflected image is seen when the optical product is viewed from the light incidence side (this phenomenon can also be seen in spectacle plastic lenses).

An optical product that allows a reflected image having such a light green reflected color to be more faint and inconspicuous is suggested by the inventor of the present invention in Japanese Laid-Open Patent Publication No. 2012-042830. In the optical product described in Japanese Laid-Open Patent Publication No. 2012-042830, reflected light has a color in a colorless and transparent range (0.27≤x≤0.30 and 0.30≤y≤0.36) on the chromaticity diagram (x,y,Y) of the CIE color system, and reflectance is 1% (percent) or less in a visible region, that is, the reflectance is very low. In a case where a total of seven layers are stacked such that a low refractive index layer and a high refractive index layer alternate, a total physical film thickness of the fourth layer or the fourth and fifth layers is preferably set so as to be in a specific range, whereby reflected light has a color in the aforementioned range on the chromaticity diagram, and the reflectance is made very low.

SUMMARY OF THE INVENTION

Figure 1:
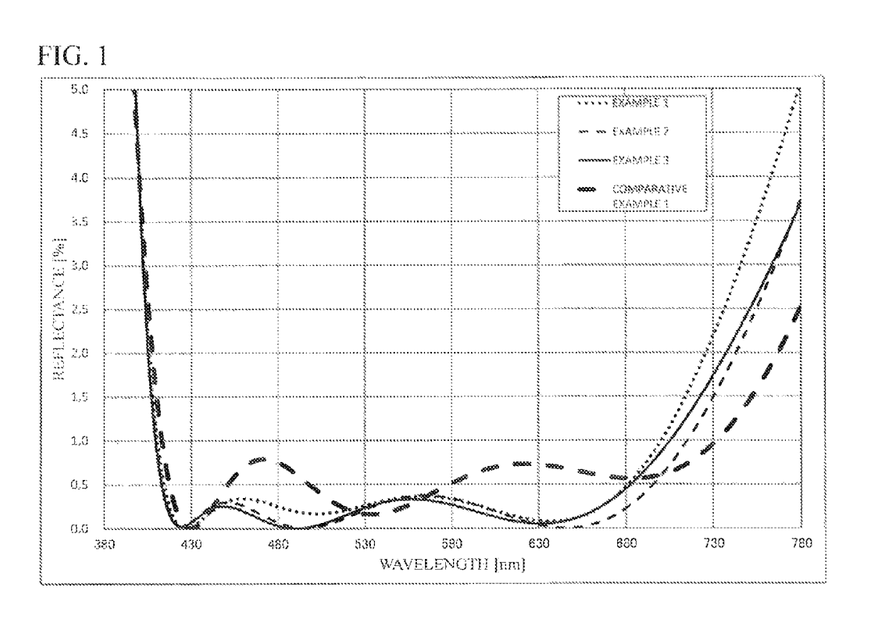
FIG. 1 is a graph showing spectral reflectance characteristics of Examples 1 to 3 and Comparative Example 1.

In the antireflection film described in Japanese Laid-Open Patent Publication No. 2012-042830, although the reflected light is colorless and inconspicuous, there is still room for further reduction in the reflectance in the visible region and for making the reflected light more inconspicuous. For example, FIG. 1 shows the reflectance is always maintained so as to be around 0.5% in a wavelength range of 450 nm to 650 nm.

Therefore, an object of the present invention is to provide an optical product which has high visible light transmittance and sufficiently reduced reflectance, and whose reflected light is very inconspicuous in color.

In order to achieve the aforementioned object, the invention according to a first aspect is directed to an optical product comprising an optical multilayer film on an optical product base, in which a color of reflected light of the optical multilayer film satisfies a condition of 0.27≤x≤0.31 and 0.30≤y≤0.36 in a chromaticity diagram (x,y,Y) of a CIE color system, reflectance is always 1 percent or less in a wavelength range from 420 nanometers to 680 nanometers, both inclusive, Y is 0.5 percent or less, the optical multilayer film has a total of seven layers, in which a first layer is counted from an optical product base side, and odd layers are low refractive index layers and even layers are high refractive index layers, and an optical film thickness of a sixth layer is greater than or equal to $0.530\lambda$, and not greater than $0.605\lambda$ when $\lambda$ represents a design wavelength (any value in a range from 480 nanometers to 520 nanometers, both inclusive).

In order to achieve an object to provide in a relatively simple manner an optical product that makes reflected light inconspicuous and to make the reflected light more inconspicuous in addition to the above object, the inventions according to second to fourth aspects are characterized in that a third layer of the optical multilayer film has an optical film thickness that is greater than or equal to $0.160\lambda$, and not greater than $0.296\lambda$, that a value p obtained by dividing the optical film thickness of the third layer of the optical multilayer film by $\lambda$, and a value q obtained by dividing the optical film thickness of the sixth layer of the optical multilayer film by $\lambda$, have a relationship indicated as $q=-0.50p+0.68$, or that the high refractive index layers are each comprised of titanium oxide, in the above invention.

In order to achieve an object to provide a spectacle plastic lens belonging to the optical product that makes reflected light very inconspicuous and has a good appearance as described above, the invention according to a fifth aspect is directed to a spectacle plastic lens in which, in the above invention, the optical product base is a spectacle plastic lens base.

According to the present invention, in the optical product, a slight amount of reflected light reflected even by a surface in which reflection is prevented due to the optical multilayer film satisfies the condition of 0.27≤x≤0.31 and 0.30≤y≤0.36 in the chromaticity diagram (x,y,Y) of the CIE color system, reflectance is always 1 percent or less in a wavelength range from 420 nanometers to 680 nanometers, both inclusive, Y (luminous reflectance) is 0.5 percent or less, the optical multilayer film has a total of seven layers, in which a first layer is counted from an optical product base side, and odd layers are low refractive index layers and even layers are high refractive index layers, and an optical film thickness of a sixth layer is greater than or equal to $0.530\lambda$, and not greater than $0.605\lambda$ when $\lambda$ represents a design wavelength (any value in a range from 480 nanometers to 520 nanometers, both inclusive). Therefore, in the reflected light, while the reflectance is of a very low level, a saturation of the reflected light is very low as compared to reflected light in conventional arts, and reflected light that is less colored, namely close to neutral, can be obtained. The reflected light having a low attention value, namely being inconspicuous, can be obtained.

DETAILED DESCRIPTION OF THE INVENTION

An embodiment of the present invention will be described below. Embodiments of the present invention are not limited to the embodiment shown below.

An optical lens as an example of an optical product of the present invention has a hard coating film and an optical multilayer film in order, respectively, from a lens base on the surface of the lens base. The film configuration may be changed so that, for example, a primer layer is formed between the lens base surface and the hard coating film, an antifouling film is formed on the surface of the optical multilayer film, an intermediate layer is provided between the lens base surface and the hard coating film, between the hard coating layer and the optical multilayer film, between the optical multilayer film and the antifouling film, or the like, and that the hard coating film is omitted. The hard coating film, the optical multilayer film, or the like may be formed on the back surface of the lens base or on both front and back surfaces of the lens base. The antifouling film is preferably comprised of a silane compound having a perfluoropolyether group.

Examples of the material (base material) of the lens base include plastic and glass. Examples of the plastic include a polyurethane resin, an episulfide resin, a polycarbonate resin, a polyester resin, an acrylic resin, a polyether sulfone resin, a poly(4-methylpentene-1) resin, and a diethylene glycol bis(allyl carbonate) resin. A preferred example having a high refractive index for the lens is a polyurethane resin that is obtained by addition polymerization of a polyisocyanate compound with a polythiol and/or a sulfur-containing polyol, and a preferred example having a higher refractive index for the lens is an episulfide resin obtained by addition polymerization of an episulfide group with a polythiol and/or a sulfur-containing polyol.

Further, the hard coating film is preferably comprised of an organosiloxane resin and inorganic oxide particles, in particular. In this case, the hard coating solution is prepared by primarily dispersing (mixing) an organosiloxane resin and an inorganic oxide particle sol in water or an alcohol solvent.

An organosiloxane resin obtained by hydrolyzing and condensing an alkoxysilane is preferred as the organosiloxane resin. Specific examples of the alkoxysilane include γ-glycidoxypropyltrimethoxysilane, γ-glycidoxypropyltriethoxysilane, methyl trimethoxysilane, and ethyl silicate. The hydrolysis condensates of these alkoxysilanes are manufactured by hydrolyzing the alkoxysilane compounds or combinations thereof by an acidic aqueous solution such as hydrochloric acid.

As the inorganic oxide particles, for example, a sol of zinc oxide, silicon dioxide, aluminum oxide, titanium oxide, zirconium oxide, tin oxide, beryllium oxide, antimony oxide, tungsten oxide, or cerium oxide, or mixed crystals of two or more of the sols, can be used. The particle size of the inorganic oxide particles is preferably 1 to 100 nanometers (nm) and more preferably 1 to 50 nm in order to ensure transparency of the hard coating film. Preferably the inorganic oxide particles are contained in an amount of 40 to 60 wt % of the hard coating component in order to ensure appropriate levels of hardness and toughness of the hard coating film.

In addition, the hard coating solution may contain an acetylacetone metal salt, an ethylenediaminetetraacetic acid metal salt, or the like, as a curing catalyst, as necessary. The hard coating solution may further contain a surfactant, a colorant, a solvent, or the like, as necessary for adjustment of a coating agent.

The thickness of the hard coating film is preferably 0.5 to 4.0 μm (micrometers), and more preferably 1.0 to 3.0 μm. If the thickness of the hard coating film is excessively thin, sufficient hardness cannot be obtained for practical use. Thus, the lower limit of the thickness of the film is set so as not to be excessively reduced. Hardness is enhanced according to increase of the thickness of the hard coating film. However, if the thickness is excessively increased, the possibility of problems about physical properties may be increased, for example, cracking is more likely to occur and brittleness may be increased. Thus, the upper limit of the thickness of the film is set so as not to be excessively increased.

The optical multilayer film is formed by alternately stacking a low refractive index layer and a high refractive index layer by a vacuum deposition method, a sputtering method, or the like. An inorganic oxide is used for each layer. Examples of the inorganic oxide include silicon oxide, titanium oxide having a higher refractive index than silicon oxide, zirconium oxide, aluminum oxide, yttrium oxide, tantalum oxide, hafnium oxide, tin oxide, niobium oxide, cerium oxide, and indium oxide. Substoichiometric titanium oxide (TiOx, x<2, and x is close to 2) can be used, and an ITO film can be used in at least one layer.

The optical multilayer film is designed as an antireflection film, and further has the following characteristics. That is, a color of reflected light slightly reflected from the optical multilayer film is very inconspicuous, with x being in the range of 0.27 to 0.31 and y being in the range of 0.30 to 0.36 in a chromaticity diagram (x,y,Y) of a CIE color system. The reflectance is 1% or less and the luminous reflectance Y is 0.5% or less in a visible wavelength range of 420 to 680 nm.

EXAMPLES

Overview

As described below, Examples 1 to 5 were produced which belong to optical products according to the present invention. Comparative Examples 1 and 2 that do not belong to the present invention were also produced in order to compare with Examples 1 to 5. Measurement of spectral reflectance characteristics in a visible light region, and measurement of reflected light still reflected even though reflection was prevented on the chromaticity diagram (x,y, Y) of the CIE color system were carried out for each of Examples 1 to 5 and Comparative Examples 1 and 2.

Configuration

Lens bases of Examples 1 to 5 and Comparative Examples 1 and 2 were flat lenses made of plastic, and a polyurethane resin having a refractive index of 1.60 was used for each of Examples 1 to 5 and Comparative Examples 1 and 2. These lens bases can be used as spectacle plastic lens bases. These lens bases had a standard size of spectacle plastic lenses.

Various antireflection films were formed on the surfaces of these lens bases. Each of the antireflection films was an optical multilayer film having a seven-layer structure of first to seven layers in order, respectively, from a lens base side, in which odd layers were comprised of silicon dioxide (low refractive index material) and even layers were comprised of titanium dioxide (high refractive index material). The first to seven layers were sequentially vapor deposited so as to have optical film thicknesses as indicated in [Table 1] to [Table 7] shown below. [Table 1] to [Table 5] show the optical film thickness or the like of each layer in Examples 1 to 5, respectively, and [Table 6] and [Table 7] show the optical film thickness or the like of each layer in Comparative Examples 1 and 2, respectively. Although the design wavelength (center wavelength) λ is mainly 500 nm in the following description, the design wavelength can be changed as desired in the range of 480 to 520 nm. Further, when λ=500 nm, the refractive index of silicon dioxide is 1.4693, and the refractive index of titanium dioxide is 2.4176.

TABLE 1

Example 1

| | Material | Refractive index | Optical film thickness |
|---|---|---|---|
| First layer | SiO2 | 1.4693 | 0.050λ |
| Second layer | TiO2 | 2.4176 | 0.025λ |
| Third layer | SiO2 | 1.4693 | 0.296λ |
| Fourth layer | TiO2 | 2.4176 | 0.046λ |
| Fifth layer | SiO2 | 1.4693 | 0.142λ |
| Sixth layer | TiO2 | 2.4176 | 0.532λ |
| Seventh layer | SiO2 | 1.4693 | 0.261λ |

TABLE 2

Example 2

| | Material | Refractive index | Optical film thickness |
|---|---|---|---|
| First layer | SiO2 | 1.4693 | 0.073λ |
| Second layer | TiO2 | 2.4176 | 0.038λ |
| Third layer | SiO2 | 1.4693 | 0.251λ |
| Fourth layer | TiO2 | 2.4176 | 0.069λ |
| Fifth layer | SiO2 | 1.4693 | 0.127λ |
| Sixth layer | TiO2 | 2.4176 | 0.556λ |
| Seventh layer | SiO2 | 1.4693 | 0.260λ |

TABLE 3

Example 3

| | Material | Refractive index | Optical film thickness |
|---|---|---|---|
| First layer | SiO2 | 1.4693 | 0.058λ |
| Second layer | TiO2 | 2.4176 | 0.048λ |
| Third layer | SiO2 | 1.4693 | 0.204λ |
| Fourth layer | TiO2 | 2.4176 | 0.091λ |
| Fifth layer | SiO2 | 1.4693 | 0.114λ |
| Sixth layer | TiO2 | 2.4176 | 0.571λ |
| Seventh layer | SiO2 | 1.4693 | 0.256λ |

TABLE 4

Example 4

| | Material | Refractive index | Optical film thickness |
|---|---|---|---|
| First layer | SiO2 | 1.4693 | 0.059λ |
| Second layer | TiO2 | 2.4176 | 0.056λ |
| Third layer | SiO2 | 1.4693 | 0.191λ |
| Fourth layer | TiO2 | 2.4176 | 0.100λ |
| Fifth layer | SiO2 | 1.4693 | 0.107λ |
| Sixth layer | TiO2 | 2.4176 | 0.580λ |
| Seventh layer | SiO2 | 1.4693 | 0.256λ |

TABLE 5

Example 5

| | Material | Refractive index | Optical film thickness |
|---|---|---|---|
| First layer | SiO2 | 1.4693 | 0.061λ |
| Second layer | TiO2 | 2.4176 | 0.068λ |
| Third layer | SiO2 | 1.4693 | 0.162λ |
| Fourth layer | TiO2 | 2.4176 | 0.123λ |
| Fifth layer | SiO2 | 1.4693 | 0.088λ |
| Sixth layer | TiO2 | 2.4176 | 0.604λ |
| Seventh layer | SiO2 | 1.4693 | 0.253λ |

TABLE 6

Comparative Example 1

| | Material | Refractive index | Optical film thickness |
|---|---|---|---|
| First layer | SiO2 | 1.4693 | 0.254λ |
| Second layer | TiO2 | 2.4176 | 0.035λ |
| Third layer | SiO2 | 1.4693 | 0.123λ |
| Fourth layer | TiO2 | 2.4176 | 0.073λ |
| Fifth layer | SiO2 | 1.4693 | 0.059λ |
| Sixth layer | TiO2 | 2.4176 | 0.508λ |
| Seventh layer | SiO2 | 1.4693 | 0.255λ |

TABLE 7

Comparative Example 2

| | Material | Refractive index | Optical film thickness |
|---|---|---|---|
| First layer | SiO2 | 1.4693 | 0.050λ |
| Second layer | TiO2 | 2.4176 | 0.066λ |
| Third layer | SiO2 | 1.4693 | 0.159λ |
| Fourth layer | TiO2 | 2.4176 | 0.123λ |
| Fifth layer | SiO2 | 1.4693 | 0.078λ |
| Sixth layer | TiO2 | 2.4176 | 0.629λ |
| Seventh layer | SiO2 | 1.4693 | 0.253λ |

Figure 2:
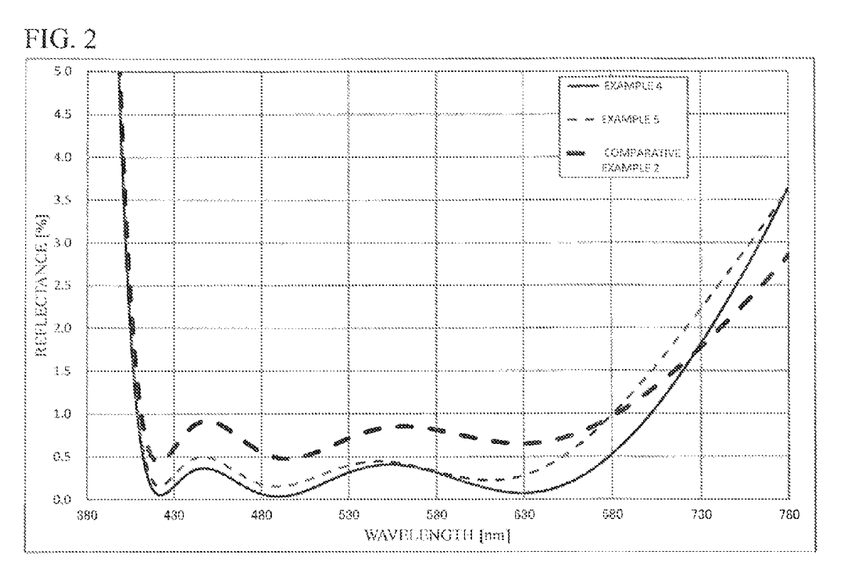
FIG. 2 is a graph showing spectral reflectance characteristics of Examples 4 and 5 and Comparative Example 2.
Figure 3A:
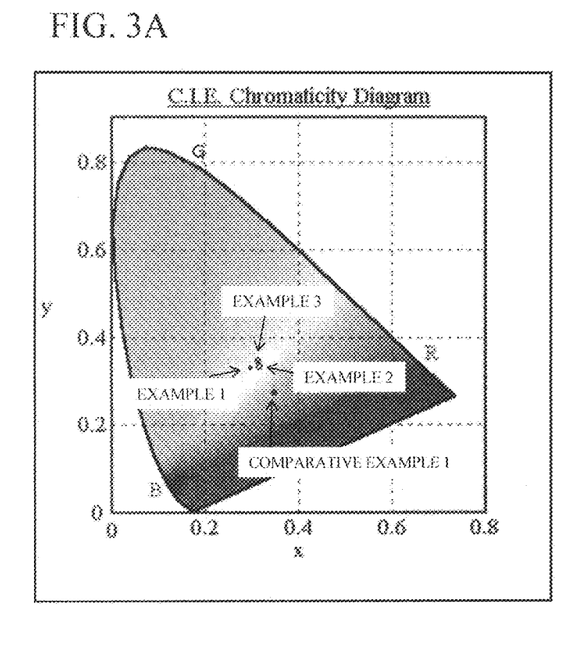
FIG. 3A is a chromaticity diagram of a CIE color system, showing positions of reflected light in Examples 1 to 3 and Comparative Example 1.
Figure 3B:
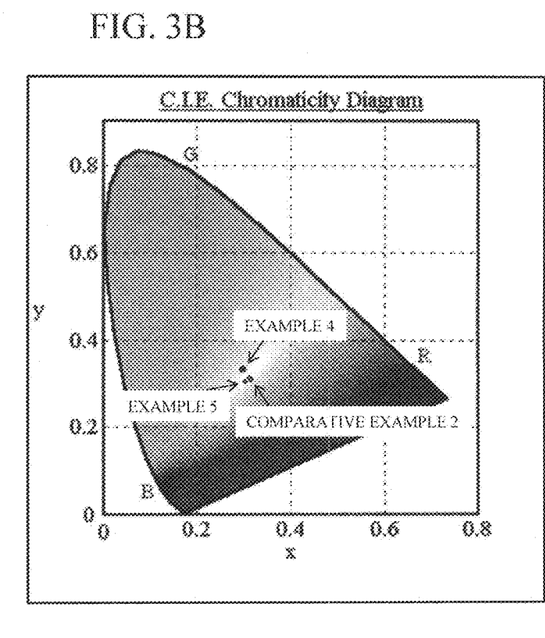
FIG. 3B is a chromaticity diagram of the CIE color system, showing positions of reflected light in Examples 4 and 5 and Comparative Example 2.
Figure 3C:
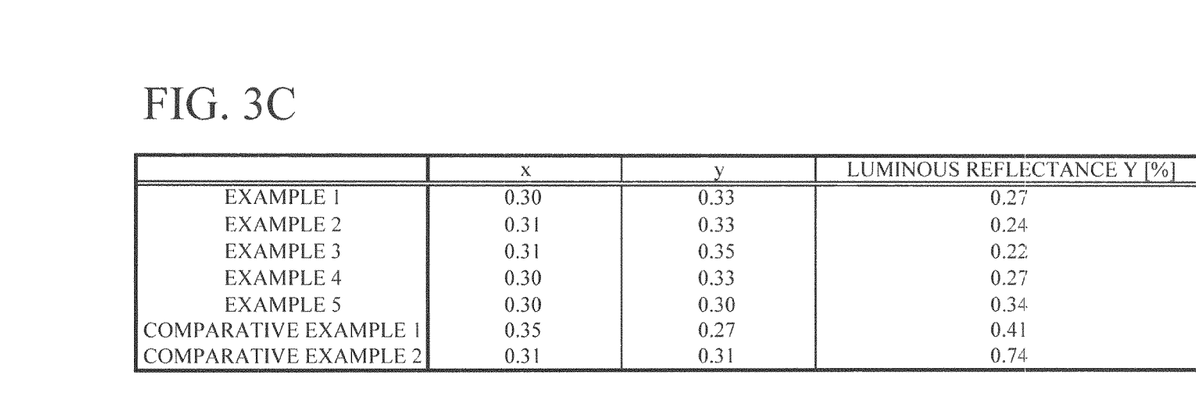
FIG. 3C is a table showing luminous reflectances Y and the positions of reflected light on the chromaticity diagram of the CIE color system in Examples 1 to 5 and Comparative Examples 1 and 2.

Spectral Reflectance Characteristics and Chromaticity Diagram (x,y,Y) of Reflected Light in Color System FIG. 1 is a graph showing spectral reflectance characteristics of Examples 1 to 3 and Comparative Example 1. FIG. 2 is a graph showing spectral reflectance characteristics of Examples 4 and 5 and Comparative Example 2. FIG. 3A is a chromaticity diagram of the CIE color system, showing positions of reflected light in Examples 1 to 3 and Comparative Example 1. FIG. 3B is a chromaticity diagram of the CIE color system, showing positions of reflected light in Examples 4 and 5 and Comparative Example 2. FIG. 3C is a table showing luminous reflectances Y and the positions of reflected light on the chromaticity diagram of the CIE color system in Examples 1 to 5 and Comparative Examples 1 and 2.

The spectral reflectance was measured on one side of the lens by using a lens spectral reflectometer (USPM-RU made by OLYMPUS CORPORATION). Each chromaticity coordinate value is calculated as an object color by spectrocolorimetry from the spectral reflectance by using a D65 light source as a light source and a viewing angle of 2 degrees.

In Example 1 (optical film thickness of the third layer: 0.296λ, optical film thickness of the sixth layer: 0.532λ), (x,y)=(0.30, 0.33) is satisfied, and reflected light having a low intensity in the visible light region due to antireflection film, has a very low saturation and is almost colorless. Moreover, the luminous reflectance Y is 0.27. This value corresponds to a very low value of 0.5% or less. In this Example and the remaining Examples described below, λ=500 nm unless otherwise specified.

In Example 2 (optical film thickness of the third layer: 0.251λ, optical film thickness of the sixth layer: 0.556λ), (x,y)=(0.31, 0.33) is satisfied, and a saturation is very low. The luminous reflectance Y is 0.24, that is, it is also very low. In Example 3 (optical film thickness of the third layer: 0.204λ, optical film thickness of the sixth layer: 0.571λ), (x,y)=(0.31, 0.35) is satisfied, and a saturation is similarly very low. The luminous reflectance Y is 0.22, that is, it is also very low.

In Example 4 (optical film thickness of the third layer: 0.191λ, optical film thickness of the sixth layer: 0.580λ), (x,y)=(0.30, 0.33) is satisfied, and a saturation is very low. The luminous reflectance Y is 0.27, that is, it is also very low. In Example 5 (optical film thickness of the third layer: 0.162λ, optical film thickness of the sixth layer: 0.604λ), (x,y)=(0.30, 0.30) is satisfied, and a saturation is similarly very low The luminous reflectance Y is 0.34, that is, it is also very low.

On the other hand, in Comparative Example 1 (optical film thickness of the third layer: 0.123λ, optical film thickness of the sixth layer: 0.508λ), although the luminous reflectance Y is 0.41, (x,y)=(0.35, 0.27) is satisfied. This does not mean that the saturation is very low, and the reflected light is slightly colored. In Comparative Example 2 (optical film thickness of the third layer: 0.159λ, optical film thickness of the sixth layer: 0.629λ), (x,y)=(0.31, 0.31) is satisfied, which means that a saturation is very low. However, the luminous reflectance Y is 0.74. That is, the luminous reflectance Y is not in a level in which the value is 0.50 or less.

Evaluation

As described above, according to Examples 1 to 5, the optical product can be provided in which the optical multilayer film (antireflection film) has a total of seven layers in which the odd layers are low refractive index layers and the even layers are high refractive index layers, and, in the optical multilayer film, 0.27≤x≤0.31 and 0.30≤y≤0.36 is satisfied, reflectance is always 1% in a wavelength range of 420 nm to 680 nm, and the luminous reflectance Y is 0.5% or less, and thus a very small amount of reflected light is generated and the reflected light is colorless and very inconspicuous. In the optical product, as compared to both Comparative Examples 1 and 2, the sixth layer of the optical multilayer film has an optical film thickness that is greater than or equal to 0.530λ, and not greater than 0.605λ.

Accordingly, when the optical film thickness of the sixth layer is in the above specific range, it is effective for considerably lowering a saturation of the reflected light slightly reflected from the optical multilayer film and for greatly reducing the luminous reflectance. In addition, when the optical film thickness of the third layer is in the range described below, the effectiveness is enhanced. That is, the optical film thickness of the third layer is preferably greater than or equal to 0.160λ, and not greater than 0.296λ.

Figure 4:
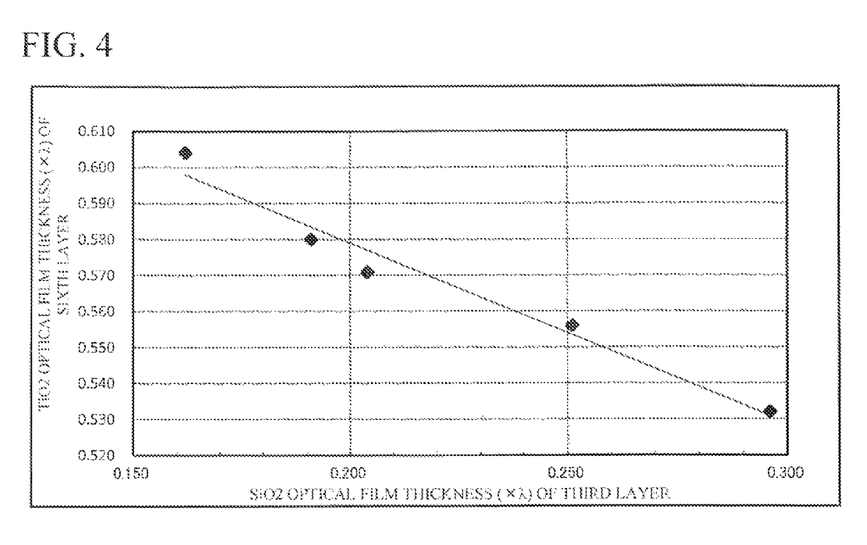
FIG. 4 is a graph showing an advantageous correlation between an optical film thickness of a third layer and an optical film thickness of a sixth layer.

Furthermore, especially in Examples 1 to 5, when the optical film thickness of the third layer and the optical film thickness of the sixth layer are correlated with each other, an effect that the reflected light is made colorless and the luminous reflectance is greatly reduced, can be enhanced. FIG. 4 is a graph showing the correlation. As shown in FIG. 4, when p represents a value obtained by dividing the optical film thickness of the third layer by the design wavelength λ, and q represents a value obtained by dividing the optical film thickness of the sixth layer by the design wavelength λ, the optical film thicknesses preferably have the correlation indicated by the following equation.

$$q=-0.50p+0.68$$

In Examples 1 to 5, tests were separately made for adhesion performance, boiling resistance, sweat resistance, salt resistance, and moisture resistance. Regardless of whether or not the third and sixth layers of the optical multilayer film were thicker than other layers, each of Examples exhibited advantageous performance.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An optical product comprising an optical multilayer film on an optical product base,
    wherein a color of reflected light of the optical multilayer film satisfies a condition of 0.27≤x≤0.31 and 0.30≤y≤0.36 in a chromaticity diagram (x,y,Y) of a CIE color system,
    wherein reflectance is always 1 percent or less in a wavelength range from 420 nanometers to 680 nanometers, both inclusive,
    wherein Y is 0.5 percent or less,
    wherein the optical multilayer film has a total of seven layers, in which a first layer is counted from an optical product base side, and odd layers are low refractive index layers and even layers are high refractive index layers,
    wherein an optical film thickness of a sixth layer is greater than or equal to 0.530λ, and not greater than 0.605λ when λ represents any value in a design wavelength range from 480 nanometers to 520 nanometers, both inclusive, and
    wherein a third layer of the optical multilayer film has an optical film thickness that is greater than or equal to 0.160λ, and not greater than 0.296λ.

2. The optical product according to claim 1, wherein a value p obtained by dividing the optical film thickness of the third layer of the optical multilayer film by λ, and a value q obtained by dividing the optical film thickness of the sixth layer of the optical multilayer film by λ, have a relationship indicated by the following equation:

$$q=-0.50p+0.68.$$

3. The optical product according to claim 1, wherein the high refractive index layers are each comprised of titanium oxide.

4. The optical product according to claim 2, wherein the high refractive index layers are each comprised of titanium oxide.

5. A spectacle plastic lens, wherein the spectacle plastic lens is included in the optical product according to claim 1, and the optical product base is a spectacle plastic lens base.

6. A spectacle plastic lens, wherein the spectacle plastic lens is included in the optical product according to claim 2, and the optical product base is a spectacle plastic lens base.

7. A spectacle plastic lens, wherein the spectacle plastic lens is included in the optical product according to claim 3, and the optical product base is a spectacle plastic lens base.

8. A spectacle plastic lens, wherein the spectacle plastic lens is included in the optical product according to claim 4, and the optical product base is a spectacle plastic lens base.

\* \* \* \* \*